United States Patent [19]

Sugden

[11] Patent Number: 4,953,663
[45] Date of Patent: Sep. 4, 1990

[54] OIL SUPPLY FOR INTEGRATED DRIVE GENERATOR

[75] Inventor: Kenneth B. Sugden, Rockford, Ill.

[73] Assignee: Sundstrand Corporation, Rockford, Ill.

[21] Appl. No.: 324,756

[22] Filed: Mar. 17, 1989

[51] Int. Cl.⁵ .............................................. F01M 9/00
[52] U.S. Cl. ..................................... 184/6.12; 310/58; 310/114
[58] Field of Search ................... 184/6.12; 310/58, 114

[56] References Cited

U.S. PATENT DOCUMENTS

| | | | |
|---|---|---|---|
| 4,046,222 | 9/1977 | Skrivanek | 184/6.12 |
| 4,284,913 | 8/1981 | Barnhardt | |
| 4,715,244 | 12/1987 | Byrd | 184/6.12 |
| 4,844,202 | 7/1989 | Maresko | 184/6.12 |

*Primary Examiner*—Douglas Hart
*Attorney, Agent, or Firm*—Antonelli, Terry, Stout & Kraus

[57] ABSTRACT

An integrated drive generator oil supply (50) for providing pressurized oil to a constant speed drive transmission which drives a rotor (40) of an alternating current generator at a constant velocity to generate constant frequency alternating current and to at least one additional apparatus requiring pressurized oil and discharging oil into an oil reservoir during generation of the alternating current in accordance with the invention includes a pump (16) for providing pressurized oil from the oil circuit (28) for providing pressurized oil from the pump to an oil cooling circuit (100) within the alternating current generator for cooling the alternating current generator; an oil circuit (105) for providing oil directly from oil discharged from the oil cooling circuit to at least a part of the constant speed drive transmission which after lubricating the constant speed drive transmission is discharged into the oil reservoir.

25 Claims, 3 Drawing Sheets

OIL SUPPLY FOR INTEGRATED DRIVE GENERATOR

CROSS REFERENCE TO RELATED APPLICATION

Reference is made to patent application Ser. No. 324,752, pending entitled "Oil Management Tank System" filed on even date herewith.

TECHNICAL FIELD

The present invention relates to oil supplies for integrated drive generators used for generating constant frequency alternating current on airframes. More particularly, the present invention relates to oil supplies for integrated drive generators having reduced weight.

BACKGROUND ART

Integrated drive generators have been in use for many years in generating electrical power on airframes. An integrated drive generator functions to produce three phase 400 Hz. alternating current when driven by a variable speed power takeoff from the airframe propulsion engine. The integrated drive generator is contained in a single case which contains a constant speed drive transmission which converts the variable speed shaft input from the power takeoff from the airframe propulsion engine to a constant speed drive for driving an alternating current generator mounted within the case of the integrated drive generator. The constant speed drive transmission includes critical elements which require pressurized oil during the generation of alternating current by the integrated drive generator. These units include a hydraulic pump and motor, differential, cooling for the main generator and lubrication of the rotor of the main generator. All of these elements operate in a conventional fashion as is known in the art which does not form part of the present invention.

FIG. 1 illustrates a block diagram of a prior art oil supply system for an integrated drive generator of the type manufactured by the assignee of the present invention. The integrated drive generator 10 has a case (not illustrated) which collects oil in an oil sump 12 located in the bottom of the case. The oil sump 12 supplies oil which is pressurized and applied to various parts of the integrated drive generator as described below. A scavenge pump 14 pressurizes oil from the oil sump 12 and applies it to a filter and deaerator (not illustrated). The output of the deaerator, which contains oil of higher quality than that pumped by the scavenge pump 14, is applied to the intake of charge pump 16. A charge pump 16 functions to pressurize the oil with a head such as 250 psi. The output of the charge pump 16 is applied to an oil circuit 18 which contains a plurality of parallel branches 20, 22, 24, 26 and 28. Branch 20 supplies pressurized oil to a hydraulic pump and motor 30 which is a conventional part of the constant speed drive transmission contained in the integrated drive generator. Branch 22, which contains a restriction 32, provides a bypass around the hydraulic pump and motor to permit the bypassing of oil around the hydraulic pump and motor instead of requiring that all oil being applied to charge relief valve 34 must flow through the hydraulic pump and motor 30. Charge relieve valve 34 controls the output pressure of oil in the oil circuit 18 by shunting oil back to the intake of charge pump 16 when the pressure of oil outputted by the charge pump is above the limit at which the charge relief valve opens. Branch 24 applies pressurized oil to differential 36 which is part of the conventional constant speed drive transmission contained within the integrated drive generator. Oil from the differential 36 is outputted to the main sump 12. Branch 26 applies pressurized oil to the back iron of the main generator stator 38. The back iron of the stator 38 contains channels through which oil flows to cool the main generator in a conventional fashion. Oil is outputted from the oil cooling circuit of the stator 38 to oil sump 12. Pressurized oil in branch 28 cools the main generator rotor 40 and is applied to the bearings of the rotor to provide lubrication for the bearings rotatably supporting the rotor. Oil is outputted from the bearings of the main generator to the oil sump 12.

While an oil circuit generally similar to that illustrated in FIG. 1 has worked satisfactorily in airframes, it has the disadvantage of requiring a scavenge pump 14 and charge pump 16 which are sized to satisfy the parallel oil flow requirements of the hydraulic pump and motor 30, differential 36, main generator stator 38 and main generator rotor 40. As a consequence of the oil flow requirements for supplying pressurized oil to the parallel oil circuits of the hydraulic pump and motor 30, differential 36, main generator stator 38 and main generator rotor 40, the overall capacity of the charge pump must be rated to exceed the cumulative maximum oil capacity which may be drawn by each of the aforementioned units within the integrated drive generator. Furthermore, in order to preclude any possibility of starving the charge pump 16 of oil, the scavenge pump 14 must be sized to provide a larger oil flow to the intake of the charge pump, such as 150% of the rated output of the charge pump. As a result, the parallel oil flow circuits 20, 24, 26 and 28, which respectively provide oil to the hydraulic pump and motor 30 differential 36, main generator stator 38 and main generator rotor 40, require the scavenge pump 14 and charge pump 16 to be large enough to satisfy the aforementioned oil flow requirements.

Any reduction in the overall rated output of the charge pump results in a weight savings in the integrated drive generator in that the charge pump may be downsized and further the scavenge pump may be downsized even further as a result of its having a rated output higher than the rated output of the charge pump. Reduction in pump size also enhances the overall efficiency of the integrated drive generator.

DISCLOSURE OF INVENTION

The present invention provides an integrated drive generator oil supply which is lighter in weight than the prior art illustrated in FIG. 1. The weight saving achieved by the present invention is of particular significance given the preferred application of the present invention as being for generating constant frequency alternating current in airframes.

An integrated drive generator oil supply for providing pressurized oil to a constant speed drive transmission, which drives a rotor of an alternating current generator at a constant velocity to generate constant frequency alternating current, and to at least one additional apparatus requiring pressurized oil and discharging oil into an oil reservoir during generation of alternating current in accordance with the invention includes a pump for providing pressurized oil from the oil reservoir of the integrated drive generator; an oil circuit for providing pressurized oil from the pump to an oil circuit within the alternating current generator for cooling the alternating current generator; and an oil circuit for providing pressurized oil directly from oil discharged from the oil cooling circuit to at least a part of the constant speed drive transmission which after lubricating the constant speed drive transmission is discharged into the reservoir. The pump is a charge pump; the constant speed drive transmission comprises a differential which receives pressurized oil from the oil circuit for cooling the alternating current generator and discharges oil into the oil reservoir; and the oil circuit for cooling the alternating generator is disposed in the stator of the alternating current generator. The constant speed drive transmission further comprises a hydraulic pump and motor which receives pressurized oil from the charge pump and returns oil to an intake of the charge pump. The at least one additional apparatus comprises bearings rotatably supporting a rotor of the alternating current generator which receive pressurized oil from the charge pump and which discharge oil into the oil reservoir and a rotor cooling oil circuit which discharges oil into the oil reservoir.

The reservoir comprises an oil tank contained within the integrated drive generator and an oil sump contained within a case of the integrated drive generator; the bearings discharge oil into the oil sump and the rotor cooling oil circuit discharges oil into the oil tank; and the differential discharges oil into the oil sump. An additional pump provides pressurized oil to an inlet of the charge pump from the oil reservoir.

An integrated drive generator oil supply for providing pressurized oil to a stator of the alternating current generator and to a differential of a constant speed drive transmission which drives a rotor of an alternating current generator at a constant velocity to generate constant frequency alternating current in accordance with the invention includes a scavenge oil pump for providing pressurized oil at an output from an oil reservoir within the integrated drive generator; a charge oil pump having an intake coupled to the output of the scavenge pump for providing pressurized oil at an output; an oil circuit for providing pressurized oil from the output of the charge pump to an oil cooling circuit within a stator of the alternating current generator; and an oil circuit for providing oil discharged from the oil cooling circuit directly to the differential of the constant speed drive for lubricating the differential which discharges the lubricating oil into the oil reservoir. The oil supply further comprises at least one additional apparatus requiring pressurized oil and discharging oil into the oil reservoir during generation of the alternating current; and an oil circuit for providing pressurized oil from the output of the charge pump to the at least one additional apparatus. The at least one additional apparatus comprises a rotor of the alternating current generator. The constant speed drive transmission further comprises a hydraulic pump and hydraulic motor for receiving pressurized oil from the charge pump and discharging oil at the intake of the hydraulic motor.

In an oil supply of an integrated drive generator having a scavenge pump for applying pressurized oil from an oil reservoir within the integrated drive generator to a charge pump which supplies pressurized oil at an output to a plurality of apparatus disposed within the integrated drive generator during the generation of constant frequency alternating current by a main generator located within the integrated drive generator, an improvement in accordance with the present invention comprises a series oil circuit having an intake coupled to the output of the charge pump, containing at least two of the plurality of apparatus with each of the apparatus being in series so that oil flowing within the series circuit flows sequentially through the at least two apparatus and a discharge which discharges oil after flowing through the at least two apparatus into the oil reservoir.

BEST MODE FOR CARRYING OUT THE INVENTION

Figure 1:
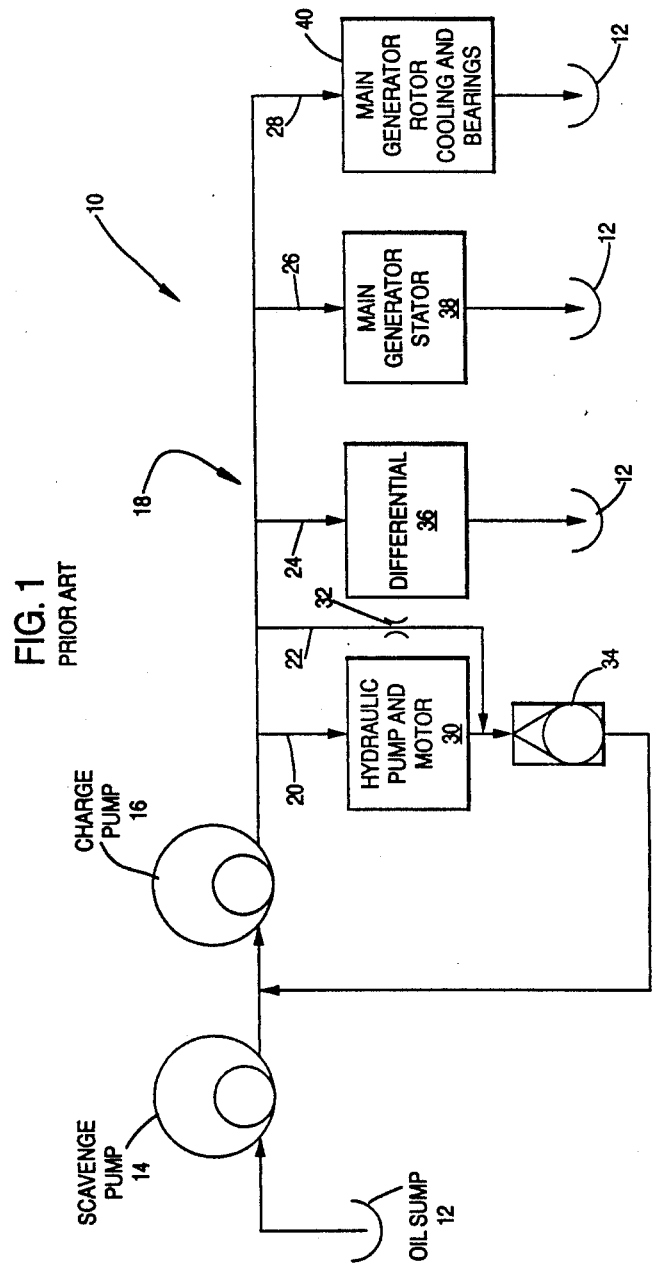
FIG. 1 illustrates a schematic of a prior art oil supply for an integrated drive generator.
Figure 2:
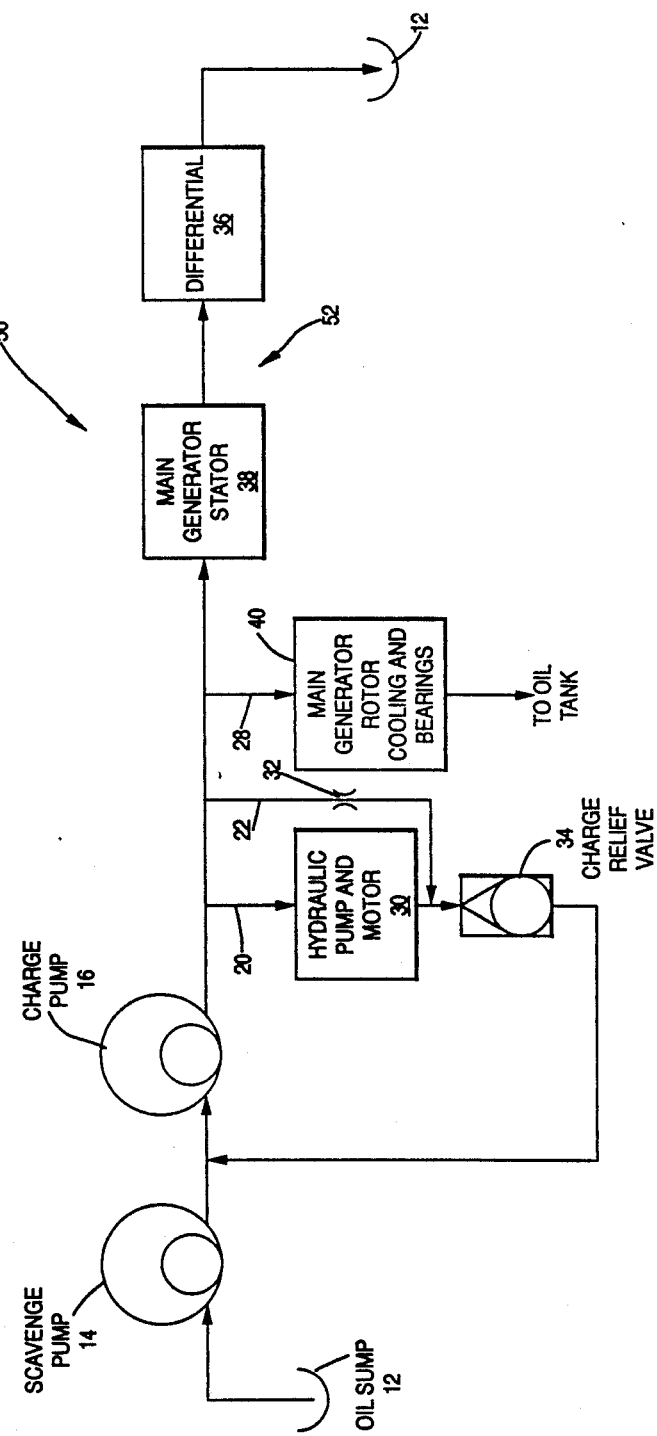
FIG. 2 illustrates a block diagram of an oil supply for an integrated drive generator in accordance with the present invention.

FIG. 2 illustrates a block diagram of an embodiment 50 in accordance with the present invention. Like reference numerals identify like parts in FIGS. 1 and 2. The functions of like parts in FIGS. 1 and 2 will not be discussed herein except to the extend necessary to understand the present invention with it being understood that those parts whose function is not discussed operate in the same manner as described above with reference to the prior art of FIG. 1. The present invention achieves a reduced weight oil supply for an integrated drive generator by utilization of a series oil circuit 52 which connects pressurized oil outputted from the charge pump 16 to at least two apparatus within the integrated drive generator requiring pressurized oil during the generation of constant frequency alternating current so that oil flowing within the series circuit flows sequentially through the at least two apparatus and is discharged by a discharge after flowing through the at least two apparatus into a reservoir within the integrated drive generator which may be the oil sump or an oil tank described below. By providing the series circuit 52, the overall rated output capacity of the scavenge pump 14 and charge pump 16 is reduced as a consequence of the oil flow requirement of the apparatus located in the series oil circuit being satisfied by sequential oil flow instead of by all apparatus requiring pressurized oil during the generation of alternating current with parallel oil flow which increases the required rated output capacities of the charge pump and scavenge pump in the prior art. Accordingly, the overall weight of the oil supply 50 of an integrated drive generator in accordance with the embodiment of FIG. 2 is reduced by downsizing the scavenge pump 14 and charge pump 16 pumping capacities to supply the requisite rated oil flows to the oil circuit which includes a combination of parallel and series oil flow.

In the preferred form of the present invention, a cooling oil circuit disposed within the back iron of the main generator stator 38 is connected directly to the output of the charge pump 16. The pressurized oil from the charge pump 16 flows through the cooling oil circuit within the back iron of the main generator stator 38 and is discharged directly into the differential of the constant speed drive transmission which functions to drive the rotor 40 of the main generator at constant velocity to generate constant frequency alternating current. The oil directly applied from the output of the cooling oil circuit of the main generator 38 to the differential 36 functions to lubricate the differential in a conventional manner and is discharged to the oil sump 12.

Figure 3:
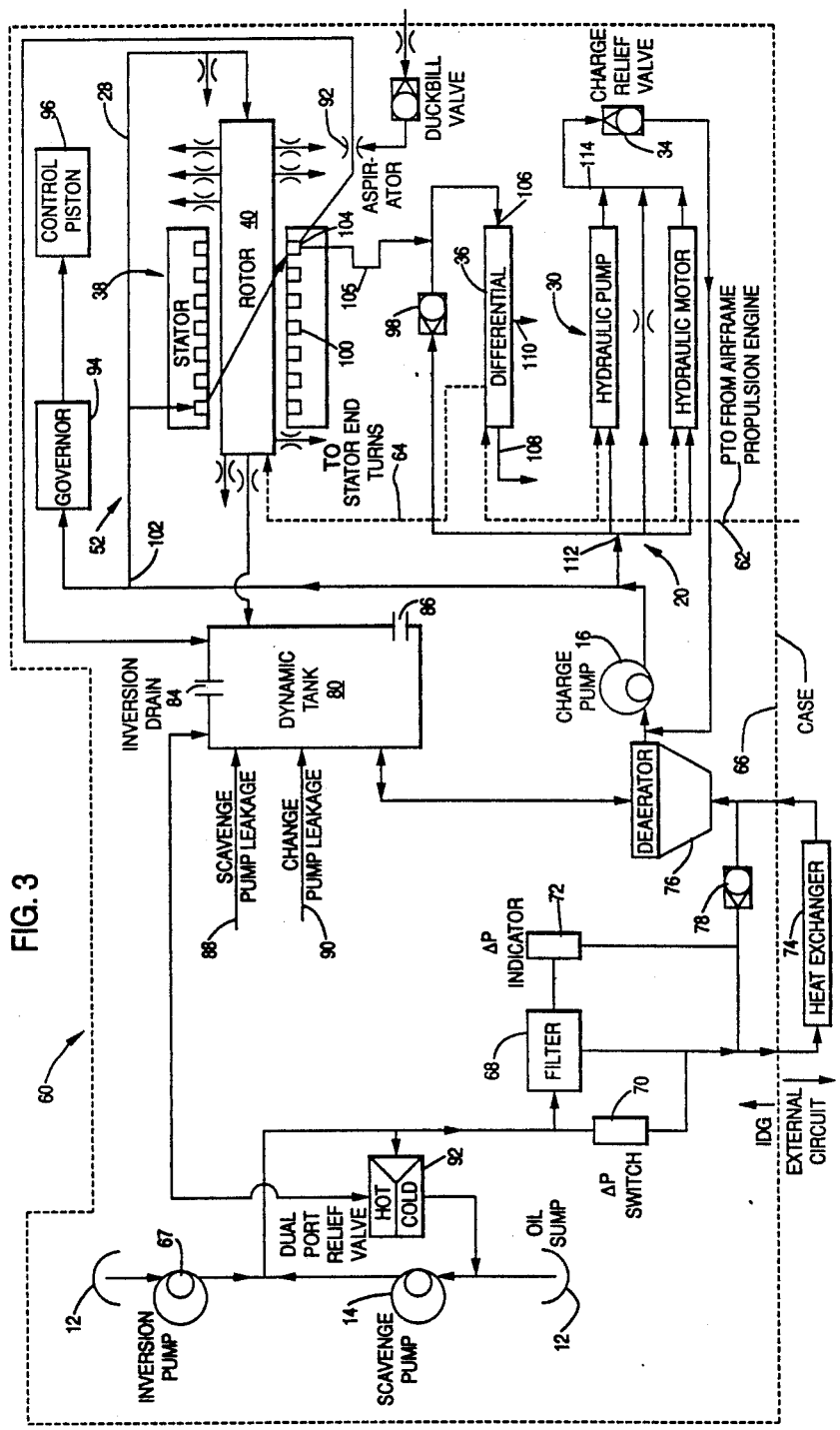
FIG. 3 illustrates a block diagram of a preferred embodiment of the present invention as applied to an airframe power generating system.

FIG. 3 illustrates a block diagram of a preferred embodiment 60 of the present invention. Like reference numerals identify like parts in FIGS. 1-3. The function of parts illustrated in FIG. 3, which function in a manner identical to that described above with respect to the prior art of FIG. 1, will not be herein described except to the extent necessary to understand the operation of the embodiment illustrated in FIG. 3. Power takeoff 62, which is driven at variable speed by the airframe propulsion engine, applies torque to the hydraulic pump and motor 30 and the differential 36. The differential 36 has a constant speed output 64 which drives the rotor 40 at constant velocity to cause constant frequency 400 Hz. three phase alternating current to be generated. The aforementioned operation is conventional. Case 66 closes the entire integrated drive generator 60 and forms the oil sump 12 which has been illustrated schematically. An inversion pump 66 functions to pump oil from the sump 12 when the integrated drive generator is inverted or is at a steep angle near inversion in flight with respect to its normal horizontal inclination in the same manner as the scavenge pump 14 pumps oil when the integrated drive generator is in its normal horizontal or inclined inclination. The combination of the scavenge pump 14 and inversion pump 67 prevents apparatus from being damaged which require a critical supply of pressurized oil for operation. The output of the scavenge pump 14 and inversion pump 67 is applied to filter 68 which functions to remove any particulate matter entrained in the oil pumped by the scavenge pump 14 or inversion pump 67. The switch 70 provides an indication to the cockpit of the airframe when filter 68 is plugged. Indicator 72 provides a visual indication to maintenance personnel when the filter 68 is plugged. Oil pumped from the filter is pumped outside of the case 66 to heat exchanger 74 to cool the oil prior to application to deaerator 76. Relief valve 78 provides a bypass to the heat exchanger if the pressure drop in the heat exchanger is too high. Dynamic tank 80 provides a second portion of an oil reservoir within the integrated drive generator 60 with the sump 12 providing the other portion of the oil reservoir. The function of the dynamic tank 80 is dual fold in that various oil flows to the tank including an output from the deaerator 76 maintain the tank full to reduce the overall level of oil within the sump 12 of case 66. Furthermore, if for some reason the output from the deaerator 76 is insufficient to supply the requisite flow of oil to the intake of charge pump 16 during normal level or banked but non-inverted flight, oil flows from the dynamic tank 80 into the input of the charge pump 16 to make up for any deficiency in the output of oil from the deaerator necessary to maintain the requisite amount of oil flow to the charge pump to prevent starving oil critical apparatus from pressurized oil outputted from the charge pump. Dual port relief valve 82 functions to provide oil to the dynamic tank 80 from the output of the scavenge pump 14 and the inversion pump 67 when the output pressure from the scavenge pump 14 or inversion pump 12 exceed a predetermined pressure limit at which the relief valve opens. However, under cold starting conditions, the dual port relief valve 82 diverts oil back to the intake of the scavenge pump 14. The dynamic tank 80 has a drain 84 in the top which permits oil to flow out of the tank when the net oil flow into the tank is sufficient to maintain the tank above the full level. Drain 86 permits debris and other matter to be drained from the bottom of the dynamic tank. The dynamic tank 80 also receives scavenge pump leakage 88, charge pump leakage 90, oil from aspirator 92 which functions in a conventional manner to remove water from the oil within the integrated drive generator. Maintaining the tank full during generation of alternating current reduces the level of oil in the oil sump 12 which lessens the possibility of thermal runaway and increases the efficiency of the operation of the equipment within the integrated drive generator by reducing mechanical drag consequent from high oil levels. The charge pump applies pressurized oil to governor 94 which controls the position of control piston 96 which varies the angle of the swash plate of the hydraulic pump. Relief valve 98 opens to apply pressurized hydraulic fluid directly to the differential 36 when the output of the cooling circuit 100 within the stator has oil pressure dropped below a predetermined pressure. Typically the relief valve 98 opens with a pressure of 150 psi with the charge relief valve 34 opening at a pressure of 250 psi.

The series oil circuit 52 has an input 102 connected to the output of the charge pump 16. Oil flows from the input 102 to the oil cooling circuit 100 which is located in the back iron of the stator 38. The cooling circuit 100 is of conventional construction and causes oil to flow helically through the back surface of the stator 38 to cool the stator. The output 104 of the cooling oil circuit 100 is applied by oil circuit 105 directly to the input 106 of the differential 36. The oil applied to the input 106 of the differential 36 functions to lubricate the differential and is discharged to the oil sump at outputs 108 and 110. Furthermore, the circuit 28 for the rotor 40 is in parallel to the series circuit 52 and functions to supply oil for lubricating bearings rotatably supporting the rotor and further to an oil cooling circuit flowing axially through the rotor. Similarly, the branch 20 has input 112 connected directly to the output of the charge pump 16 and output 114 connected to the charge relief valve 34 to configure the branch 20 in parallel with the oil supplied to the rotor 40.

While the invention has been described in terms of its preferred embodiment, it should be understood that numerous modifications may be made thereto without departing from the spirit and scope of the invention as defined in the appended claims. It is intended that all such modifications fall within the scope of the appended claims.

I claim:

1. An integrated drive generator oil supply for providing pressurized oil to a constant speed drive transmission, which drives a rotor of an alternating current generator at a constant velocity to generate constant frequency alternating current, and to at least one additional apparatus requiring pressurized oil and discharging oil into an oil reservoir during generation of the alternating current comprising:
   a pump for providing pressurized oil from the oil reservoir of the integrated drive generator;
   means for providing pressurized oil from the pump to an oil circuit within the alternating current generator for cooling the alternating current generator; and
   means for providing oil directly from oil discharged from the oil circuit to at least a part of the constant speed drive transmission which after lubricating the constant speed drive transmission is discharged into the oil reservoir.

2. An oil supply in accordance with claim 1 wherein:
the pump is a charge pump;
the constant speed drive transmission comprises a differential which receives pressurized oil from the oil circuit and discharges oil into the oil reservoir; and
the oil circuit is disposed in a stator of the alternating current generator.

3. An oil supply in accordance with claim 2 wherein the constant speed drive transmission further comprises:
a hydraulic pump and hydraulic motor which receives pressurized oil from the charge pump and returns oil to an intake of the charge pump.

4. An oil supply in accordance with claim 3 wherein:
the at least one additional apparatus comprises bearings rotatably supporting a rotor of the alternating current generator which receive pressurized oil from the charge pump and which discharge oil into the oil reservoir in a case of the integrated drive generator and rotor cooling oil circuit which discharges oil into the oil reservoir.

5. An oil supply in accordance with claim 4 wherein the oil reservoir comprises:
an oil tank contained within the integrated drive generator and an oil sump contained within the case of the integrated drive generator; and wherein
the bearings discharge oil into the oil sump and the rotor cooling oil circuit discharges oil into the oil tank; and
the differential discharges oil into the oil sump.

6. An oil supply in accordance with claim 1 wherein the constant speed drive transmission further comprises:
a hydraulic pump and hydraulic motor which receives pressurized oil from the charge pump and returns oil to an intake of the charge pump.

7. An oil supply in accordance with claim 1 wherein:
the at least one additional apparatus comprises bearings rotatably supporting a rotor of the alternating current generator which receive pressurized oil from the pump and which discharge oil into the reservoir in a case of the integrated drive generator and rotor cooling oil circuit which discharges oil into the oil reservoir.

8. An oil supply in accordance with claim 7 wherein the reservoir comprises:
an oil tank contained within the integrated drive generator and an oil sump contained within the case of the integrated drive generator; and wherein
the bearings discharge oil into the oil sump and the rotor cooling oil circuit discharges oil into the oil tank; and
the differential discharges oil into the oil sump.

9. An oil supply in accordance with claim 2 wherein:
the at least one additional apparatus comprises bearings rotatably supporting a rotor of the alternating current generator which receive pressurized oil from the pump and which discharge oil into the reservoir in a case of the integrated drive generator and rotor cooling oil circuit which discharges oil into the oil reservoir.

10. An oil supply in accordance with claim 9 wherein the reservoir comprises:
an oil tank contained within the integrated drive generator and an oil sump contained within the case of the integrated drive generator; and wherein
the bearings discharge oil into the oil sump and the rotor cooling oil circuit discharges oil into the oil tank; and
the differential discharges oil into the oil sump.

11. An oil supply in accordance with claim 6 wherein:
the pump is a charge pump;
the constant speed drive transmission comprises a differential which receives pressurized oil from the oil circuit and discharges oil into the oil reservoir; and
the oil circuit is disposed in a stator of the alternating current generator.

12. An oil supply in accordance with claim 7 wherein:
the pump is a charge pump;
the constant speed drive transmission comprises a differential which receives pressurized oil from the oil circuit and discharges oil into the reservoir; and
the oil circuit is disposed in a stator of the alternating current generator.

13. An oil supply in accordance with claim 8 wherein:
the pump is a charge pump;
the constant speed drive transmission comprises a differential which receives pressurized oil from the oil circuit and discharges oil into the reservoir; and
the oil circuit is disposed in a stator of the alternating current generator.

14. An oil supply in accordance with claim 9 wherein:
the pump is a charge pump;
the constant speed drive transmission comprises a differential which receives pressurized oil from the oil circuit and discharges oil into the reservoir; and
the oil circuit is disposed in a stator of the alternating current generator.

15. An oil supply in accordance with claim 10 wherein:
the pump is a charge pump;
the constant speed drive transmission comprises a differential which receives pressurized oil from the oil circuit and discharges oil into the reservoir; and
the oil circuit is disposed in a stator of the alternating current generator.

16. An integrated drive generator in accordance with claim 1 further comprising:
an additional pump providing pressurized oil from the oil reservoir to an inlet of the pump.

17. An integrated drive generator in accordance with claim 2 further comprising:
an additional pump providing pressurized oil from the oil reservoir to an inlet of the charge pump.

18. An integrated drive generator in accordance with claim 3 further comprising:
an additional pump providing pressurized oil from the oil reservoir to an inlet of the charge pump.

19. An integrated drive generator in accordance with claim 4 further comprising:
an additional pump providing pressurized oil from the oil reservoir to an inlet of the charge pump.

20. An integrated drive generator in accordance with claim 5 further comprising:
an additional pump providing pressurized oil to an inlet of the charge pump from the oil reservoir.

21. An integrated drive generator oil supply for providing pressurized oil to a differential of a constant speed drive transmission which drives a rotor of an alternating current generator at a constant velocity to generate constant frequency alternating current and to a stator of the alternating current generator comprising:
a scavenge oil pump for providing pressurized oil at an output from an oil reservoir within the integrated drive generator;

a charge oil pump having an intake coupled to the output of the scavenge pump for providing pressurized oil at an output;

means for providing pressurized oil from the charge pump output to an oil cooling circuit within a stator of the alternating current generator; and means for providing oil discharged from the oil cooling circuit directly to the differential of the constant speed drive for lubricating the differential which discharges the lubricating oil into the reservoir.

22. An oil supply in accordance with claim 21 further comprising:

at least one additional apparatus requiring pressurized oil and discharging oil into the reservoir during generation of the alternating current; and means for providing pressurized oil from the output of the charge pump to the at least one additional apparatus.

23. An oil supply in accordance with claim 22 wherein:

the at least one additional apparatus comprises a rotor of the alternating current generator.

24. An oil supply in accordance with claim 23 wherein the constant speed drive transmission further comprises:

a hydraulic pump and hydraulic motor for receiving pressurized oil from the charge pump and discharging oil into the intake of the charge pump.

25. In an oil supply of an integrated drive generator having a scavenge pump for applying pressurized oil from an oil reservoir within the integrated drive generator to a charge pump which supplies pressurized oil at an output to a plurality of apparatus disposed within the integrated drive generator during the generation of constant frequency alternating current by a main generator located within the integrated drive generator, the improvement comprising:

a series oil circuit having an intake coupled to the output of the charge pump, containing at least two of the plurality of apparatus with each of the apparatus being in series so that oil flowing within the series circuit flows sequentially through the at least two apparatus to a discharge which discharges oil into the reservoir after flow through the at least two apparatus.

* * * * *